United States Patent [19]

Spedding

[11] Patent Number: 5,013,013

[45] Date of Patent: May 7, 1991

[54] SPRING ASSEMBLIES

[75] Inventor: Colin E. Spedding, Wolverhampton, England

[73] Assignee: GKN Technology Limited, Wolvethampton, England

[21] Appl. No.: 350,744

[22] PCT Filed: Nov. 9, 1987

[86] PCT No.: PCT/GB87/00795

§ 371 Date: Apr. 24, 1989

§ 102(e) Date: Apr. 24, 1989

[87] PCT Pub. No.: WO88/03617

PCT Pub. Date: May 19, 1988

[30] Foreign Application Priority Data

Nov. 15, 1986 [GB] United Kingdom ............... 8627357

[51] Int. Cl.⁵ ............................................. F16F 1/44
[52] U.S. Cl. ...................................... 267/165; 267/32; 267/148

[58] Field of Search ............... 267/31, 32, 34, 36.1, 267/148, 165, 259

[56] References Cited

U.S. PATENT DOCUMENTS

| | | | |
|---|---|---|---|
| 315,176 | 4/1885 | Smith | 267/36.1 |
| 1,892,198 | 12/1932 | Yevseyeff | 267/31 X |
| 2,363,837 | 11/1944 | Daugherty | 267/165 X |
| 2,594,665 | 4/1952 | Lockwood | 267/36.1 X |
| 3,390,873 | 7/1968 | Wallerstein, Jr. | 267/165 |
| 4,436,201 | 3/1984 | Inaba | 267/165 X |

Primary Examiner—Duane A. Reger

[57] ABSTRACT

A zig-zag spring in the form of a strip of fibre-reinforced plastics material with limbs connected by reflex portions, is held at its end portion by a member such that a short length (11a, 18a) of the end reflex portion (11, 18) substantially does not move angularly as the spring is compressed. Preferably an end limb (21a, 29a) extending lengthwise of the spring as a whole is so held. A suspension strut assembly, comprising two springs thus held, is disclosed.

7 Claims, 3 Drawing Sheets

SPRING ASSEMBLIES

This invention relates to springs of the type which comprises a strip of fibre-reinforced plastics material in the form of a zig-zag, having a plurality of limbs connected by reflex portions with the longitudinal centre line of the strip lying substantially in a single plane. Throughout its length, the strip is flat when viewed in cross-section. Such springs are disclosed in international patent application publication no. W085/00207, wherein they are referred to as "sulcated springs", which term will also be used herein for such springs. More particular, the invention relates to arrangements by which such springs can be mounted to other components, for use, for example, as part of a vehicle suspension arrangement.

Sulcated springs have been proposed for use in motor vehicle suspension systems, where the configuration and property of such springs can be advantageous. As compared with conventional coil springs of steel, the use of sulcated springs can lead to a reduction in weight and certain installation advantages resulting from the reduced space occupied by the spring. A sulcated spring is used as a compression spring, loaded between mounting components secured to opposite ends of the spring, and when the spring is loaded the limbs thereof are moved closer together whilst the spring bends at its reflex portions.

The life of a sulcated spring depends inter alia on the angles through which the reflex portions thereof are made to bend when the spring is compressed in use. Simply to clamp an end limb of the spring at an orientation chosen arbitrarily to interfit with the component to which the end limb is clamped is not likely to be satisfactory, since when the spring is compressed one reflex portion of the spring will bend through a greater angle than the other reflex portions of the spring. This can be detrimental to the life of the spring. For example, sulcated spring mountings wherein end limbs of the spring are held at arbitrarily chosen angles are disclosed in international patent application publication no. W087/00252, and while such spring mountings are likely to perform satisfactorily they will not provide optimum operating conditions for the spring because they do not take into consideration the manner in which the springs are deflected as they are compressed. In some of the disclosed spring mountings, end limbs of the spring are bent out of the flat cross-sectional shape of the rest of the strip constituting the spring, to engage in frusto-conical sockets, which is likely further to have a disadvantageous effect on the mode of deflection of the spring in use.

It is the object of the present invention to provide a spring assembly wherein the above described potential disadvantage is overcome or reduced.

According to the invention, I provide a spring assembly comprising a sulcated spring and a member holding an end portion of the spring, wherein the member holds the end portion of the spring by means arranged such that a short length of the reflex portion of the spring at such end portion thereof undergoes substantially no angular movement as the spring is compressed.

As is described in greater detail hereafter with reference to the drawings, holding an end portion of the spring in the manner of the invention has an effect on the behaviour of the spring which is equivalent to pin jointing an end zig-zag limb of the spring at its midpoint. Pin jointing spring end limbs in this way and applying forces to the spring at such pin joints has hitherto been considered the only means by which a sulcated spring can be made to compress uniformly along its length. However, according to the invention, uniform bending of all the reflex portions of the spring when the spring is compressed is obtained, and alternate limbs of the spring remain parallel to one another. The invention thus has the beneficial effect of providing a potential improvement in the life of the spring.

The end portion of the spring which is held preferably comprises an end limb thereof extending generally lengthwise of the spring as a whole, at a tangent to the reflex portion. Ideally, the said short length of the reflex portion which substantially does not move angularly when the spring is compressed would be exactly at the position where the end limb extends tangentially therefrom, but in practice the position of such short length of the reflex portion may not be precisely identifiable since it is a transient condition. The means holding the end portion of the spring then preferably comprises a portion supporting the end limb at said reflex portion, and a portion supporting the end limb at a position spaced from said reflex portion, to apply a bending moment to the end limb when the spring is compressed, to resist the angular movement of said short length of the reflex portion.

The means which holds the end portion of the spring must also apply a force to the spring in the direction of compression thereof. The means may have a portion abutting the free end of said end limb to apply a force thereto, or the portion which supports the end limb at said reflex portion may engage the reflex portion to apply the force thereto in the direction of compression of the spring.

The means which holds the end portion of the spring preferably is provided with an element or elements of resilient material, preferably an elastomeric material, which actually engages the spring so that the spring is protected from direct contact with any edges or unyielding surfaces which could be detrimental to the life of the spring through acting as stress raisers or potential points for abrasive wear. Such resilient material may extend to a part of the reflex portion at the end of the spring beyond the part which does not move angularly in use.

The invention further provides a suspension strut assembly comprising two members movable relative to one another along an axis, and also comprising a sulcated spring having respective end portions held to said members so as to be compressed when said members are moved towards one another along said axis, wherein each suspension member holds the respective end portion of the spring in an assembly according to the invention as above set forth.

The suspension strut assembly may incorporate the other features of the invention as above set forth.

The invention will now be described by way of example with reference to the accompanying drawings, in which.

Figure 1:
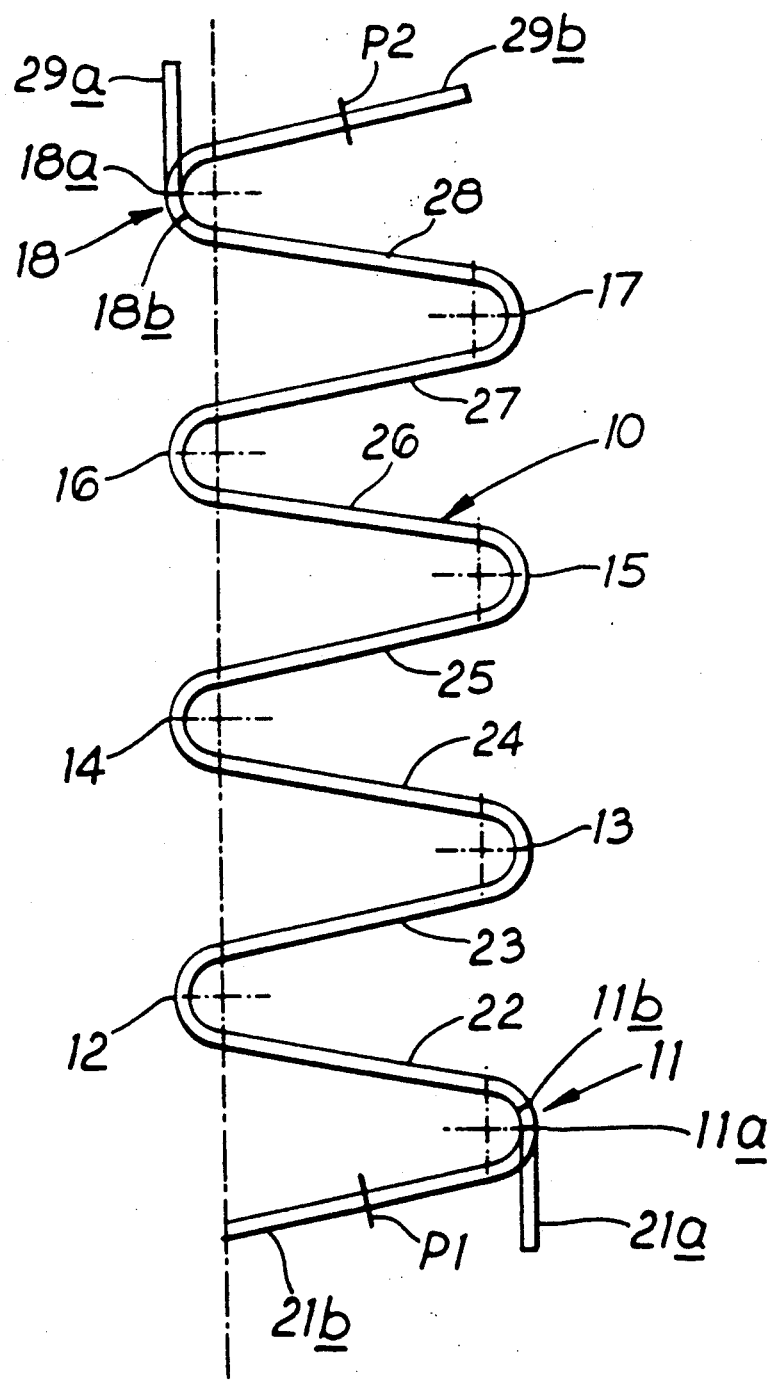
FIG. 1 is an elevation of a sulcated spring, showing alternative configurations of the end regions thereof.

Referring firstly to FIG. 1 of the drawing, a sulcated spring 10 comprises a strip of fibre reinforced plastics material in the form of a zig-zag. The spring comprises a number of reflex portions 11, 12, 13, 14, 15, 16, 17, 18, joined by limbs 22, 23, 24, 25, 26, 27 and 28. The drawing also shows end limbs of the spring 21b, 29b which are continuations of the zig-zag shape of the spring, with end limb 21b being parallel to limb 23, and end limb 29b being parallel to limb 27. The strip is of rectangular cross-section throughout its length, including all its limbs and reflex portions.

The sulcated spring is symmetrical, and if it were compressed by forces applied lengthwise of the spring as a whole at imaginary pin joints P1 P2 at opposite ends of the spring, each half way along its respective end limb, the spring would compress uniformly along its length. Alternate limbs of the spring mounted with imaginary pin joints P1 P2 would remain parallel to one another, and all the reflex portions of the spring would flex by the same amount, i.e. undergo the same angular deformation as one another. Where a spring mounted with imaginary pin joints P1 P2, to be loaded and deformed in this manner, maximum spring life results. If, however, the end limbs of the spring were to be held rigidly rather than being pin jointed, not all the reflex portions of the spring would undergo the same deformation as one another and there would be a tendency for spring life to be reduced.

It has been found that the condition of pin jointing the end limbs of the spring such that the uniform compression of the spring as above described takes place, can be simulated by holding end limbs of the spring such that a notional short length of each adjacent reflex portion of the spring is substantially prevented from moving angularly when the spring is compressed. In FIG. 1, the spring is shown with end limbs 21a, 29a which are shorter than the other limbs of the spring and which extend lengthwise of the spring as a whole, i.e. in the direction in which the spring is compressed in use, instead of being parallel to the other alternate limbs of the spring. The adjacent reflex portions 11, 18 of the spring can be considered as having parts in the form of narrow strips 11a, 18a extending across the strip constituting the spring as a whole, and according to the invention the effect of pin jointing the end limbs of the spring can be obtained if the longitudinally extending end limbs 21a, 29a are held such that the narrow strips 11a, 18a undergo substantially no angular movement when the spring is compressed. Preferably such narrow strips, which can alternatively be considered as being short lengths of the strip of composite material constituting the spring, are positioned such that the end limbs, extending in the direction of compression of the spring and tangential to the outermost parts of the reflex portions, are straight extensions of such short lengths. However, as described hereafter, the parts of the reflex portions which undergo substantially no angular movement when the spring is compressed may be slightly displaced from such positions. The means which holds the spring end limbs may, when incorporating elastomeric elements 40, extend further around the reflex portions, e.g. to the positions indicated at 11b, 18b.

Figure 2:
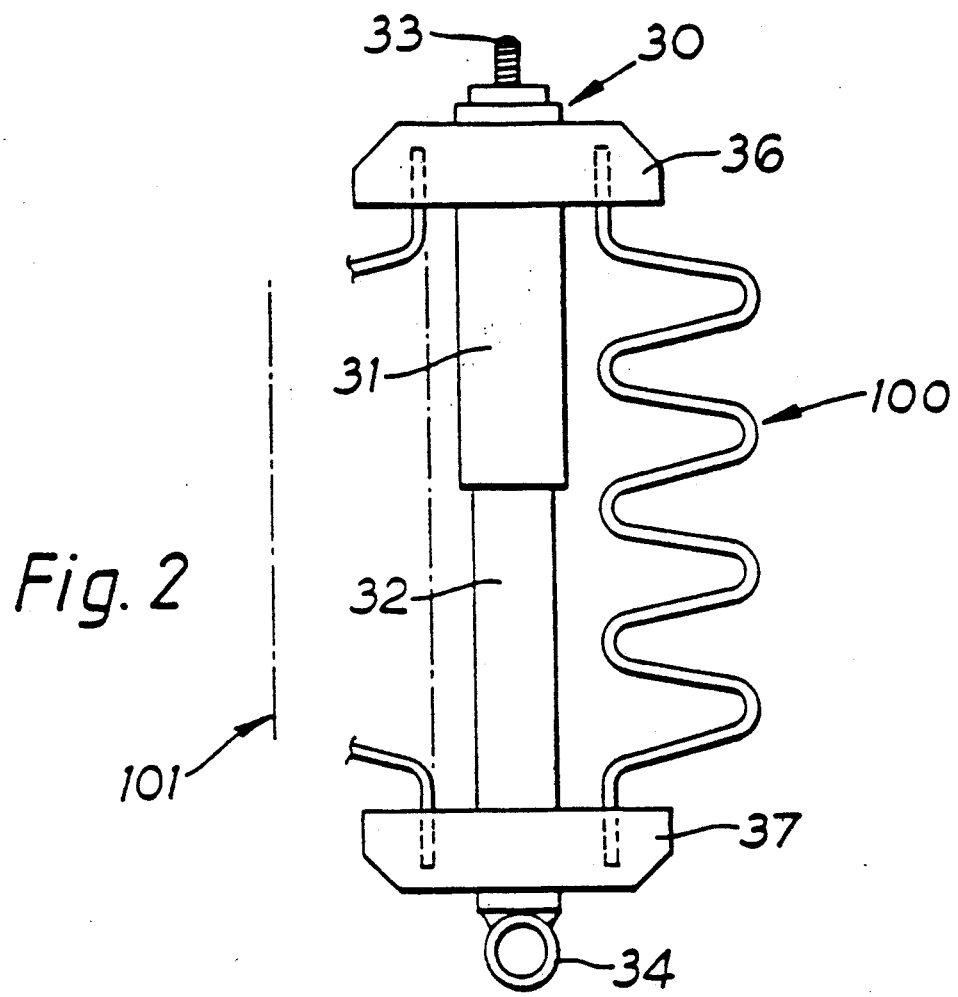
FIG. 2 is a diagrammatic elevation of a suspension strut assembly, provided with two sulcated springs.

Referring now to FIG. 2 of the drawings, there is shown a suspension strut assembly for a vehicle, using sulcated springs. The strut assembly comprises a damper 30 comprising two relatively telescopically movable parts 31, 32. Part 31 has a top mounting 33, and the part 32 has a lower mounting eye 34, for attachment, usually, to a part of the vehicle's chassis structure and to a relatively movable suspension part, respectively. The two parts 31, 32 are sprung relative to one another by two sulcated springs of which the first is shown at 100 and the second is shown in outline only at 101. The springs 100, 101 are disposed on opposite sides of the damper 30, and the longitudinal centre line of the strip constituting each spring lies in a common plane with the central axis along which the parts 31, 32 are movable relative to one another. The springs 100, 101 differ from the spring 10 in that their end limbs are in alignment with one another at the same side of the spring as a whole, instead of being offset from one another at opposite sides of the spring as a whole as is the case in the spring 10. Nevertheless, the principles above described in relation to spring 10 equally apply to springs 100, 101. The end limbs of the spring 100, 101 are held by structures 36, 37 secured to the damper parts 31, 32, respectively.

Figure 3:
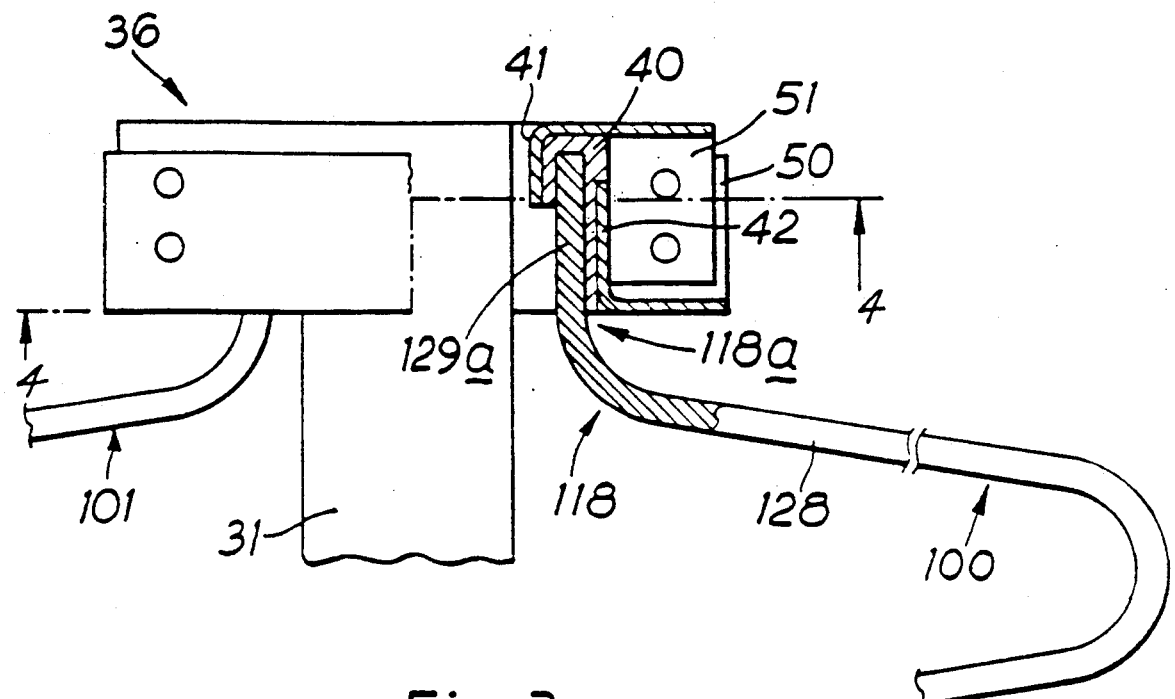
FIG. 3 is a partly sectioned view, on the line 3—3 of FIG. 4, of part of a strut assembly, showing how a sulcated spring is held therein.
Figure 4:
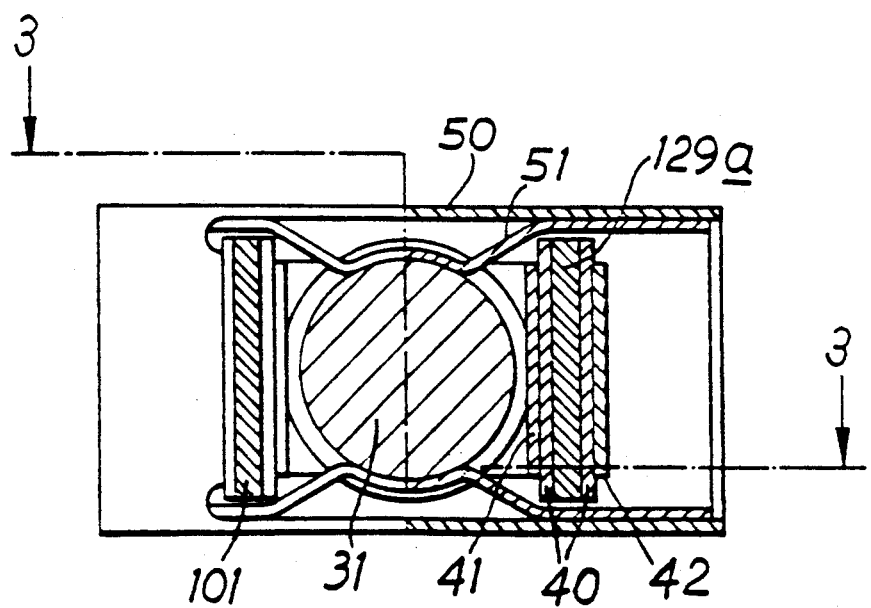
FIG. 4 is a partial section of the assembly of FIG. 3, on the line 4—4 thereof.

Referring now to FIGS. 3 and 4 of the drawings, there is shown in greater detail one embodiment of how the structure 36 may be configured for holding the end limbs of the sulcated springs. FIG. 3 shows a portion of the damper part 31, and of the spring 100 with one of its zig-zag limbs 128, and a reflex portion 118 and end limb 129a extending along the direction of compression of the spring, as for the reflex portion 18 and end limb 29a in the spring of FIG. 1. Also shown is part of the spring 101. The structure 36 comprises two interfitting pressings 50, 51 of which the inner pressing 51 embraces the damper part 31 and is secured thereto, e.g. by welding. The pressings 50, 51 are each of channel shape, and are secured together, also by welding. The pressing 51 includes a portion 41, and the pressing 50 includes a portion 42, which portions 41, 42 extend parallel to the telescopic axis of the damper and interfit as shown in FIG. 3 so as to receive the spring end limb 129a therebetween, with the interposition of a sleeve 40 of resilient material, e.g. a suitable rubber or other elastomeric material.

The pressing parts 41, 42 hold the end limb 129a of the spring 100 in such a way as to apply end load to the spring to compress it, by virtue of the pressing 41 facing the end surface of the limb 129a. They also provide a bending moment to resist the tendency of the end limb 129a to move angularly, in the anti-clockwise direction, when the spring is compressed. The effect is that when the spring is compressed, a short length of the reflex portion 118, approximately where indicated by reference numeral 118a, undergoes substantially no angular movement, thereby to achieve the condition of spring compression substantially as that if end limbs were pin jointed as first above described.

Figure 5:
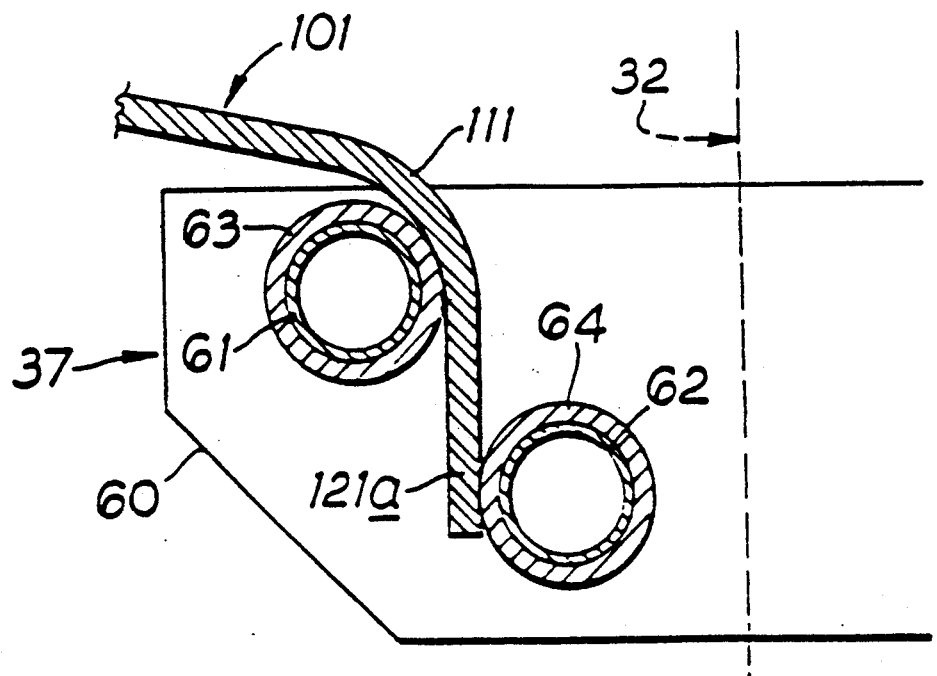
FIG. 5 is a diagrammatic section showing a further type of spring mounting.

Referring now to FIG. 5, there is shown an alternative arrangement by which an end portion of a sulcated spring may be held to achieve the advantage of the present invention. This is shown in relation to the lower end of, e.g., the spring 101 in the assembly of FIG. 2, the spring having an end limb 121a and an end reflex portion 111. The structure 37 secured to the lower part 32 of the damper unit is indicated in outline only, and such structure comprises two spaced parallel plates 60 between which extend spaced parallel tubular support elements 61, 62. The support elements 61, 62 have resilient elastomeric sleeves 63, 64, respectively, and are so positioned that the end limb 121a of the spring fits therebetween. The support element 61 engages the concave side of the reflex portion 111 of the spring, and the support element 62 is abutted by the free end of the limb 121a.

The support elements 61, 62 hold the end limb 121a of the spring in substantially the same manner, by applying a bending moment thereto to resist its tendency to move angularly when the spring is compressed, as do the parts 41, 42 in the embodiment of FIGS. 3 and 4. The result is that a small length of the reflex portion 111 of the spring undergoes substantially no angular movement when the spring is compressed. In this case, however, the force in the direction lengthwise of the spring as a whole to compress the spring is applied by the support element 61 and its engagement within the reflex portion 111 of the spring.

In practice, because of the engagement of the spring by elastomeric elements, it is difficult to identify the exact position of the short length of reflex portion of the spring which does not move angularly when the spring is compressed. Nevertheless, the above described improvement in the life of the spring is still obtained, compared with that which would apply if an end limb of the spring were simply held rigidly at some arbitrary attitude.

It will be noted that the embodiments of sulcated springs above described are formed with the strips from which they are made bent in a single plane only. The spring configuration thus used is the easiest sulcated spring configuration to manufacture.

What is claimed is:

1. A spring assembly comprising:
   a sulcated spring in the form of an elongate strip of fibre-reinforced plastics material with a centre line extending along the length of the strip;
   the strip being arranged with a plurality of limbs in zig-zag configuration interconnected by reflex portions such that the longitudinal centre line of the strip lies substantially in a single plane;
   an end limb extending in a direction generally lengthwise of the spring as a whole and at a tangent to an adjacent end reflex portion of the spring; and
   means holding the end limb of the spring so that a portion of the end reflex portion where the end limb extends tangentially therefrom undergoes substantially no angular movement as the spring is compressed lengthwise, so that the other limbs and reflex portions of the spring undergo substantially uniform deflection during said compression of the spring.

2. A spring assembly comprising:
   a sulcated spring in the form of an elongate strip of fibre-reinforced plastics material with a centre line extending along the length of the strip;
   the strip being arranged with a plurality of limbs in zig-zag configuration interconnected by reflex portions such that the longitudinal centre line of the strip lies substantially in a single plane;
   an end limb extending generally lengthwise of the spring as a whole at a tangent to an adjacent end reflex portion of the spring;
   means holding the end limb of the spring comprising a portion supporting the end limb at the end reflex portion and a portion supporting the end limb at a position spaced from the end reflex portion, to apply a bending moment to the end limb when the spring is compressed whereby a portion of the end reflex portion where the end limb extends tangentially therefrom and resists angular movement of the short length of the reflex portion and undergoes substantially no angular movement as the spring is compressed lengthwise, so that the other limbs and reflex portions of the spring undergo substantially uniform deflection during compression of the spring.

3. A spring assembly according to claim 1 wherein the means holding the end limb of the spring further comprises a portion abutting the free end of the end limb so as to apply a force thereto in the direction of compression of the spring.

4. A spring assembly according to claim 2 wherein said portion supporting the end limb at the end reflex portion engages said reflex portion to apply a force thereto in the direction of compression of the spring.

5. A spring assembly according to claim 1 wherein the means holding the end limb of the spring includes at least one resilient element contacting the spring.

6. A suspension strut assembly comprising two suspension members movable relative to one another along an axis;
   a sulcated spring having respective end limbs held by said members to be compressed in a direction parallel to said axis when said members move towards one another;
   the sulcated spring being in the form of an elongate strip of fibre-reinforced plastics material with a centre line extending along the length of the strip;
   the strip being arranged with a plurality of limbs in zig-zag configuration interconnected by reflex portions such that the longitudinal centre line of the strip lies substantially in a single plane;
   an end limb, at each end of the spring, extending generally lengthwise of the spring as a whole at a tangent to an adjacent end reflex portion of the spring; and
   each suspension member holding an end limb of the spring whereby a short portion of the end reflex portion where the end limb extends tangentially therefrom undergoes substantially no angular movement as the spring is compressed lengthwise, so that the other limbs and reflex portions of the spring undergo substantially uniform deflection during said compression of the spring.

7. A suspension strut assembly according to claim 6 comprising two of said sulcated springs disposed in mirror image of one another.

* * * * *